США008839106B2

(12) United States Patent
Lee et al.

(10) Patent No.: US 8,839,106 B2
(45) Date of Patent: Sep. 16, 2014

(54) METHOD FOR PROVIDING GUI AND MULTIMEDIA DEVICE USING THE SAME

(75) Inventors: Eun-hye Lee, Seoul (KR); Jung-ah Seung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 824 days.

(21) Appl. No.: 12/061,827

(22) Filed: Apr. 3, 2008

(65) Prior Publication Data

US 2009/0073132 A1  Mar. 19, 2009

(30) Foreign Application Priority Data

Sep. 17, 2007 (KR) .............................. 2007-0094420

(51) Int. Cl.
| | |
|---|---|
| *G06F 3/00* | (2006.01) |
| *G06F 3/0481* | (2013.01) |
| *G06F 3/0482* | (2013.01) |
| *G06F 3/0488* | (2013.01) |

(52) U.S. Cl.
CPC .... *G06F 3/0481* (2013.01); *G06F 2203/04806* (2013.01); *G06F 3/0482* (2013.01); *G06F 3/04886* (2013.01); *G06F 2203/04807* (2013.01)
USPC ............ 715/700; 345/418; 345/419; 345/619

(58) Field of Classification Search
USPC .......... 345/173, 681, 156, 168, 634; 715/700, 715/764
See application file for complete search history.

(56) References Cited

U.S. PATENT DOCUMENTS

| | | | |
|---|---|---|---|
| 6,211,856 B1 | 4/2001 | Choi et al. | |
| 6,377,285 B1 * | 4/2002 | Doan et al. | ..................... 715/764 |
| 7,075,513 B2 | 7/2006 | Silfverberg et al. | |
| 7,812,826 B2 * | 10/2010 | Ording et al. | ................. 345/173 |
| 2003/0043114 A1 | 3/2003 | Silfverberg et al. | |
| 2004/0100479 A1 * | 5/2004 | Nakano et al. | ................. 345/700 |
| 2004/0268393 A1 * | 12/2004 | Hunleth et al. | .................. 725/44 |
| 2006/0109242 A1 * | 5/2006 | Simpkins | ....................... 345/156 |
| 2008/0042978 A1 * | 2/2008 | Perez-Noguera | ............. 345/168 |
| 2008/0122870 A1 * | 5/2008 | Brodersen et al. | ............ 345/634 |

FOREIGN PATENT DOCUMENTS

| | | | |
|---|---|---|---|
| CN | 1549998 A | 11/2004 | |
| CN | 101030117 A | 9/2007 | |
| EP | 1052849 A1 * | 11/2000 | ............. H04N 5/445 |
| JP | 2006-091294 A | 4/2006 | |
| KR | 2007-37773 | 4/2007 | |

OTHER PUBLICATIONS

Search Report and Written Opinion (issued date: Nov. 19, 2008) issued from ISA with respect to International Application No. PCT/KR2008/003335 filed on Jun. 13, 2008.

* cited by examiner

*Primary Examiner* — Quan-Zhen Wang
*Assistant Examiner* — Troy Dalrymple
(74) *Attorney, Agent, or Firm* — Jefferson IP Law, LLP

(57) ABSTRACT

A graphical user interface (GUI) and a multimedia device using the same. The method for providing a graphical user interface (GUI) includes displaying first GUI items selectable by a user on a screen, removing from the screen at least one of the first GUI items displayed on the screen by zooming in or zooming out, and additionally displaying on the screen at least one second GUI item that was not displayed on the screen by zooming in or zooming out. Accordingly, a GUI to provide more convenient manipulation and better visual effect on a small screen can be provided.

20 Claims, 22 Drawing Sheets

METHOD FOR PROVIDING GUI AND MULTIMEDIA DEVICE USING THE SAME

CROSS-REFERENCE TO RELATED APPLICATION

This application claims the benefit of Korean Patent Application No. 2007-94420, filed in the Korean Intellectual Property Office on Sep. 17, 2007, the disclosure of which is incorporated herein by reference.

BACKGROUND OF THE INVENTION

1. Field of the Invention

Aspects of the present invention relate to a method for providing a graphical user interface (GUI) and a multimedia device using the same, and more particularly, to a method for providing a GUI which is used in a multimedia device having various functions, and a multimedia device using the same.

2. Description of the Related Art

As digital technology has developed and has been applied to multimedia devices, multimedia devices have provided an increasingly wide range of functions. The more functions multimedia devices provide, the more complicated the devices become. For example, since many functions are provided, the number of menus to be displayed to users increases. However, as portable multimedia devices have a small screen, it is helpful to efficiently provide many complicated menus on the screen, including providing menus that are easy to use and offer users improved visual effects.

SUMMARY OF THE INVENTION

Aspects of the present invention relate to a method for providing a graphical user interface (GUI) wherein menus are made to appear and disappear by zooming in and zooming out so as to provide more convenient user manipulation and better visual effects on a small screen, and a multimedia device using the same.

According to an aspect of the present invention, a method for providing a graphical user interface (GUI) is provided. The method includes displaying first GUI items selectable by a user on a screen; removing from the screen at least one of the first GUI items displayed on the screen by zooming in or zooming out; and additionally displaying on the screen at least one second GUI item that was not previously displayed on the screen by zooming-in or zooming-out.

According to another aspect of the present invention, the removing of the at least one of the first GUI items and the additional displaying of the at least one second GUI item are performed simultaneously.

According to another aspect of the present invention, the number of removed GUI items is the same as the number of second GUI items.

According to another aspect of the present invention, when the at least one of the first GUI items displayed on the screen is removed from the screen by zooming in, the additional displaying of the at least one second GUI item which is not displayed on the screen comprises displaying the at least one second GUI item by zooming in.

According to another aspect of the present invention, the removing comprises moving the at least one of the first GUI items displayed on the screen outside the screen by zooming in and removing the at least one of the first GUI items from the screen, and the additional displaying of the at least one second GUI item which is not previously displayed on the screen comprises moving the at least one second GUI item inside the screen by zooming in and displaying the at least one second GUI item on the screen.

According to another aspect of the invention, the removing comprising decreasing a clarity of the at least one of the first GUI items displayed on the screen by zooming in and removing the at least one of the first GUI items from the screen, and the additional displaying of the at least one second GUI item which is not displayed on the screen comprises increasing a clarity of the at least one second GUI item by zooming in and displaying the at least one second GUI item on the screen.

According to another aspect of the invention, when the at least one of the first GUI items displayed on the screen is removed from the screen by zooming out, the at least one GUI item which is not displayed on the screen is displayed by zooming out.

According to another aspect of the invention, the removing of the at least one of the first GUI items displayed on the screen comprises moving the at least one of the first GUI items within the limits of the screen by zooming out and removing the at least one of the first GUI items from the screen, and the additional displaying of the at least one second GUI item which is not displayed on the screen comprises moving the at least one second GUI item from the outside of the screen to the inside of the screen by zooming out and displaying the at least one second GUI item on the screen.

According to another aspect of the invention, the removing of the at least one of the first GUI items displayed on the screen comprises decreasing a clarity of the at least one of the first GUI items by zooming out and removing the at least one of the first GUI items from the screen, and the additional displaying of the at least one second GUI item which is not displayed on the screen comprises increasing a clarity of the at least one second GUI item by zooming out and thus is displayed on the screen.

According to another aspect of the invention, the clarity of a medium-sized GUI item from among the first GUI items displayed on the screen is higher than the clarity of the remaining first GUI items displayed on the screen.

According to another aspect of the invention, the method further includes displaying a graphic indicating the GUI items displayed on the screen from among all GUI items.

According to another aspect of the invention, the method further includes determining whether the user drags a portion of the screen, wherein the removing and the additional displaying are performed if the user drags the portion of the screen.

According to another aspect of the invention, the number of removed GUI items and the number of additionally displayed second GUI items are determined according to the distance dragged by the user.

According to another aspect of the present invention, a multimedia device is provided. The multimedia device includes a GUI generation unit to display first GUI items selectable by a user on a screen; and a control unit to the GUI generation unit so as to remove from the screen at least one of the first GUI items displayed on the screen by zooming in or zooming out from the at least one of the first GUI items, and to additionally display on the screen at least one second GUI item which was not previously displayed on the screen by zooming in or zooming out.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
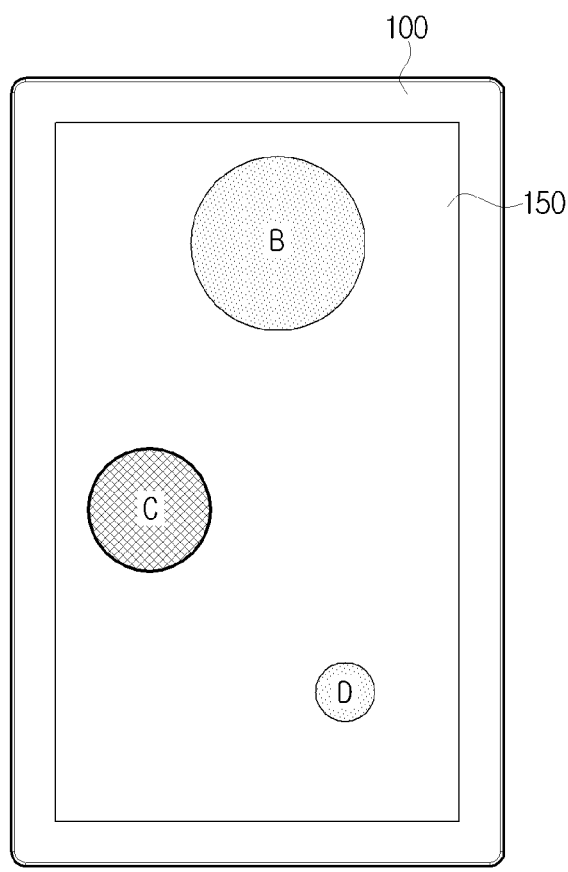
FIGS. 1A to 1E are drawings describing a GUI according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIGS. 1A to 1E show a graphical user interface (GUI) according to an embodiment of the present invention. As shown in FIG. 1A, the GUI on a touch screen 150 of a multimedia device 100 is a user interface wherein menus are made to appear and disappear by being zoomed in or out by being dragged, virtually, with the user's finger of on the touch screen 150.

In FIG. 1A, menus B, C, and D are shown in the GUI. The user can select one of the menus by touch. For example, if menu B is a menu for reproducing music stored in an embedded storage medium and the user touches menu B, the GUI of FIG. 1A may be replaced by a GUI showing a music list. As another example, if menu C is a menu for setting the configuration and the user touches menu C, the GUI of FIG. 1A may be changed to a GUI showing items for setting the configuration.

The menus may have different sizes; for example, menu B may be the largest menu and menu D the smallest menu. Accordingly, menu B appears to be the closest (shallowest) to the screen, and menu D appears to be the farthest (deepest) from the screen.

Moreover, the clarity of menu C may be higher than that of menus B and D. Menu C is thus displayed most clearly. Accordingly, the user is likely to focus on menu C. Techniques for increasing the clarity of menu C more than menus B and D may include making menu C brighter than menus B and D, making the saturation of menu C higher than that of menus B and D, or making menu C less transparent than menus B and D.

Figure 1B:
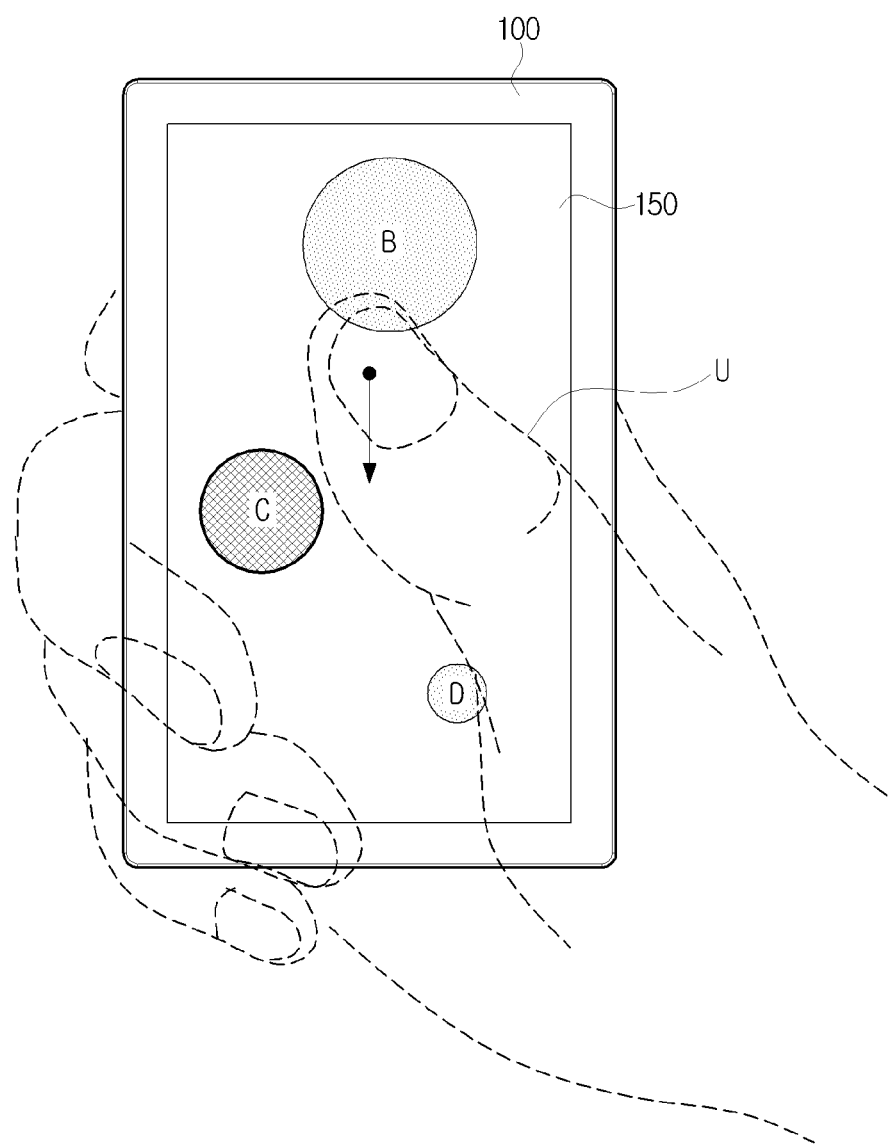

As shown in FIG. 1B, if the user U drags an area other than the menus on the touch screen 150 downwards, the GUI changes. The largest menu B is zoomed in, and moves outside the touch screen 150. During the aforementioned movement, menu B decreases in clarity. Thus, menu B increases in size, becomes blurred, moves outside the touch screen 150, and disappears from the touch screen 150.

The clearest menu C is zoomed in, and moves towards the edge of the touch screen 150 within the limits of the touch screen 150. During the aforementioned movement, menu C decreases in clarity. Thus, menu C increases in size, becomes blurred, and moves towards the edge of the touch screen 150 while remaining within the limits of the touch screen 150.

Figure 1C:
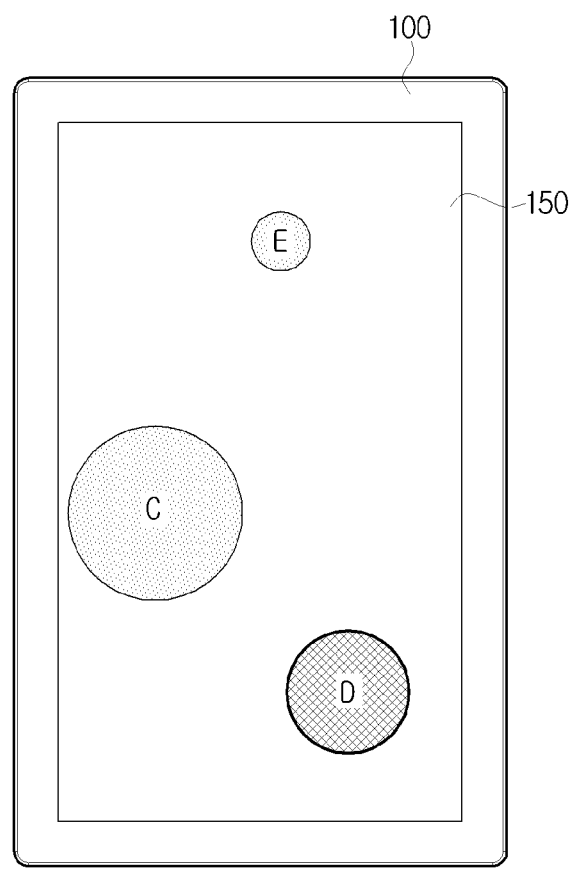

The smallest menu D is zoomed in, and moves towards the edge of the touch screen 150 within the limits of the touch screen 150. During the aforementioned movement, menu D increases in clarity. Thus, menu D increases in size, becomes clearer, and moves towards the edge of the touch screen 150 while remaining within the limits of the touch screen 150. In addition, menu E, which was not previously displayed on the touch screen 150, appears on the touch screen 150. Menu E follows menu D in order. FIG. 1C shows a GUI completing the change described above.

Figure 1D:
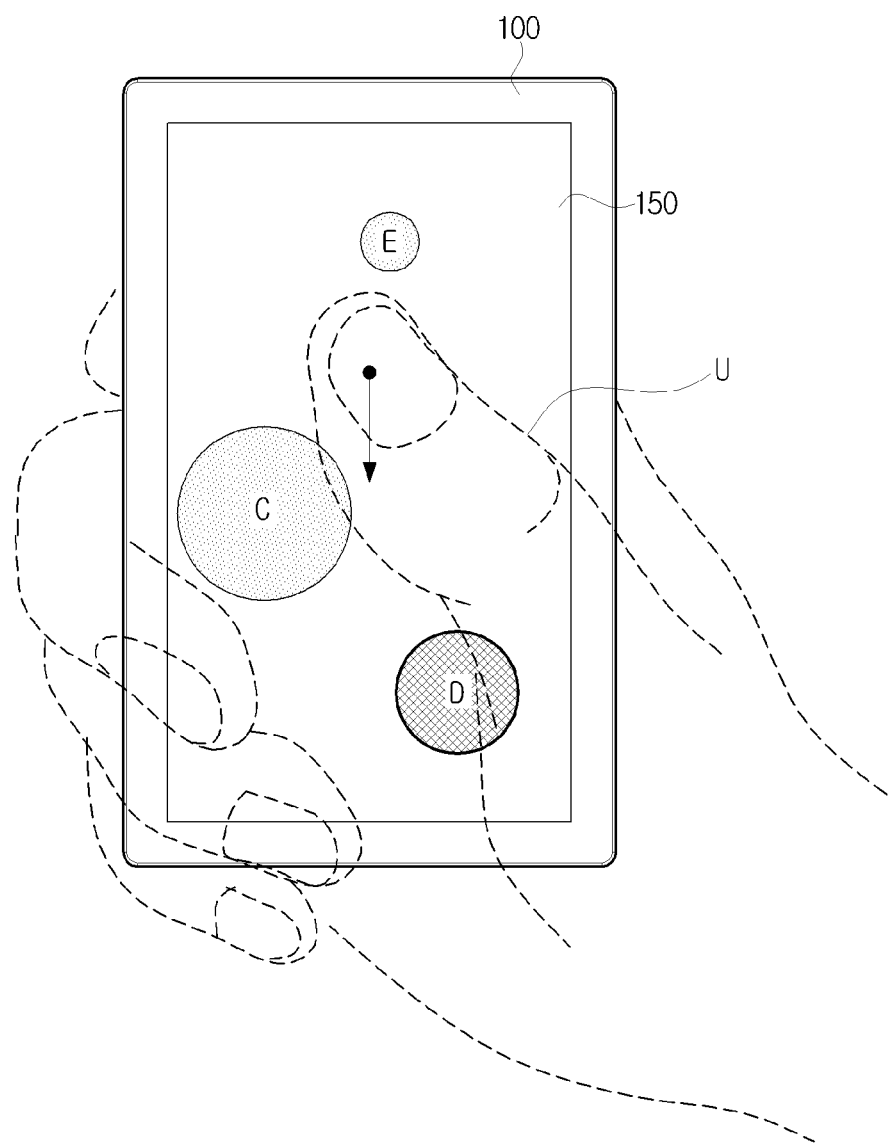

As shown in FIG. 1C, menu B is removed; menu C increases in size, becomes blurred, and moves towards the edge of the touch screen 150 while remaining within the limits of the touch screen 150; menu D increases in size, is clearer, and moves towards the edge of the touch screen 150 while remaining within the limits of the touch screen 150; and menu E appears. In the GUI of FIG. 1C, if the user U drags an area other than the menus on the touch screen 150 downwards as shown in FIG. 1D, the GUI changes in a manner similar to that described above, so a detailed description is thus omitted.

Figure 1E:
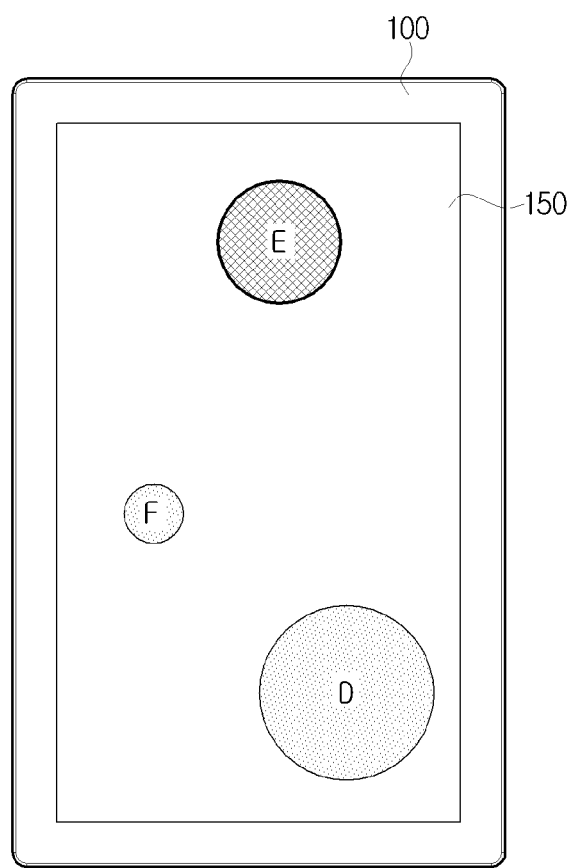

FIG. 1E shows a GUI in which the change has been completed. In the GUI, menu C is removed; menu D increases in size, becomes blurred, and moves towards the edge of the touch screen 150 while remaining within the limits of the touch screen 150; menu E increases in size, becomes clearer, and moves towards the edge of the touch screen 150 while remaining within the limits of the touch screen 150; and menu F appears.

Figure 2A:
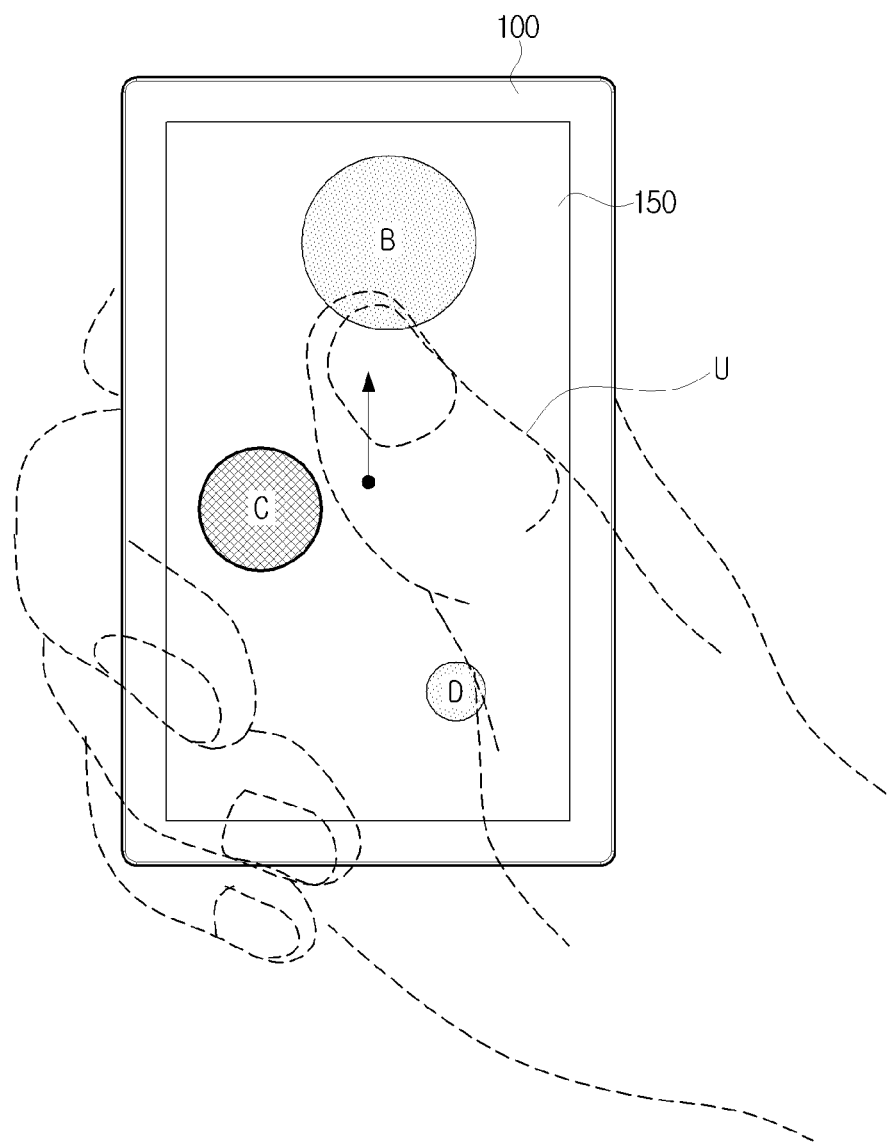
FIGS. 2A and 2B are drawings describing a process for changing the GUI by dragging the GUI upwards on the screen.

If the user U drags an area other than the menus on the touch screen 150 upwards as shown in FIG. 2A, the GUI changes as described below. The largest menu B is zoomed out, and moves towards the inside of the touch screen 150 while remaining within the limits of the touch screen 150. During the aforementioned movement, menu B increases in clarity. Thus, menu B decreases in size, becomes clearer, and moves towards the inside of the touch screen 150 while remaining within the limits of the touch screen 150.

The clearest menu C is zoomed out, and moves towards the inside of the touch screen 150 within the limits of the touch screen 150. During the movement, menu C decreases in clarity. Thus, menu C decreases in size, is blurred, and moves towards the inside of the touch screen 150 within the limits of the touch screen 150.

The smallest menu D is zoomed out, moves towards the inside of the touch screen 150 while remaining within the limits of the touch screen 150, and thus disappears. During the aforementioned movement, menu D decreases in clarity. Thus, menu D moves towards the inside of the touch screen 150 while remaining within the limits of the touch screen 150, becomes blurred, decreases in size, and finally disappears.

In addition, menu A, which was not previously displayed on the touch screen 150, appears on the touch screen 150, is zoomed out, and moves from the outside of the touch screen 150 to the inside of the touch screen 150. Menu A precedes menu B in order. During the movement, menu A increases in clarity. Thus, menu A appears from the outside of the touch screen 150, decreases in size, becomes clearer, and moves towards the inside of the touch screen 150.

Figure 2B:
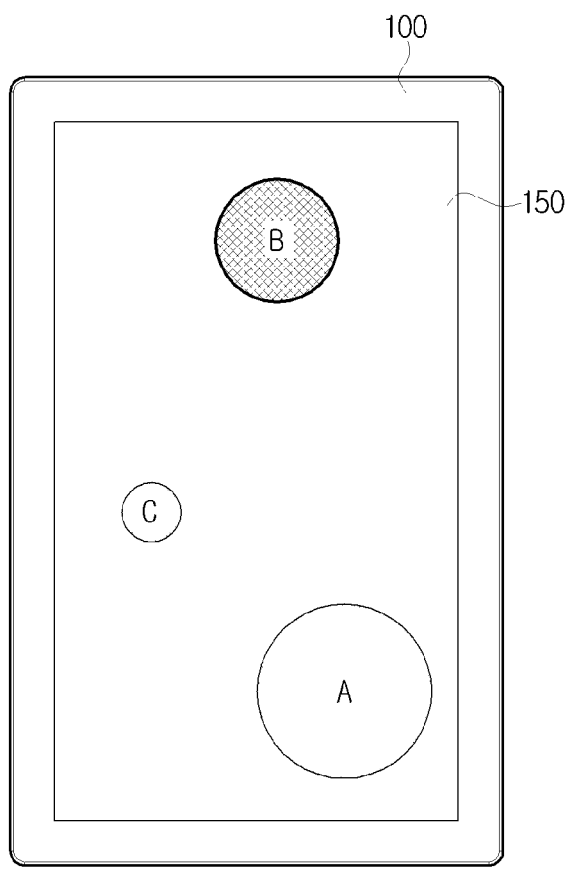

FIG. 2B shows a GUI where the change described above has been completed. As shown in FIG. 2B, in the GUI, menu B decreases in size, becomes clearer, and moves towards the inside of the touch screen 150 while remaining within the limits of the touch screen 150. Menu C decreases in size, becomes blurred, and moves towards the inside of the touch screen 150 within the limits of the touch screen 150. Menu D moves towards the inside of the touch screen 150, becomes blurred, decreases in size, and thus disappears. Menu A appears from the outside of the touch screen 150 to the inside of the touch screen 150, decreases in size, becomes clearer, and moves towards the inside of the touch screen 150.

Figure 3A:
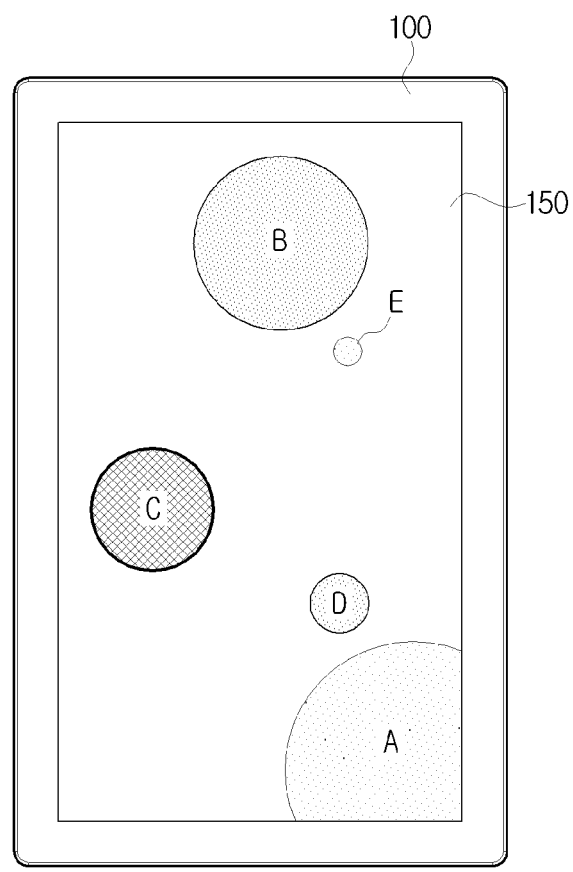
FIGS. 3A to 3C illustrate a GUI according to another embodiment of the present invention.

FIG. 3A shows a GUI according to another embodiment of the present invention. The GUI of FIG. 3A is distinct from the GUI of FIG. 1A in that the GUI of FIG. 3A displays menus A and E, in addition to menus B, C, and D.

Menu A, which includes a part that is not displayed on the touch screen 150 is larger than menu B, and is shown to be the closest (shallowest) to the touch screen 150. Menu E is smaller than menu D, and is shown to be the farthest (deepest) from the touch screen 150. The clarity of menus A and E is lower than that of menus B and D, so menus A and E are shown to be the most blurred. Menus A and E cannot be selected by the user's touch.

Figure 3B:
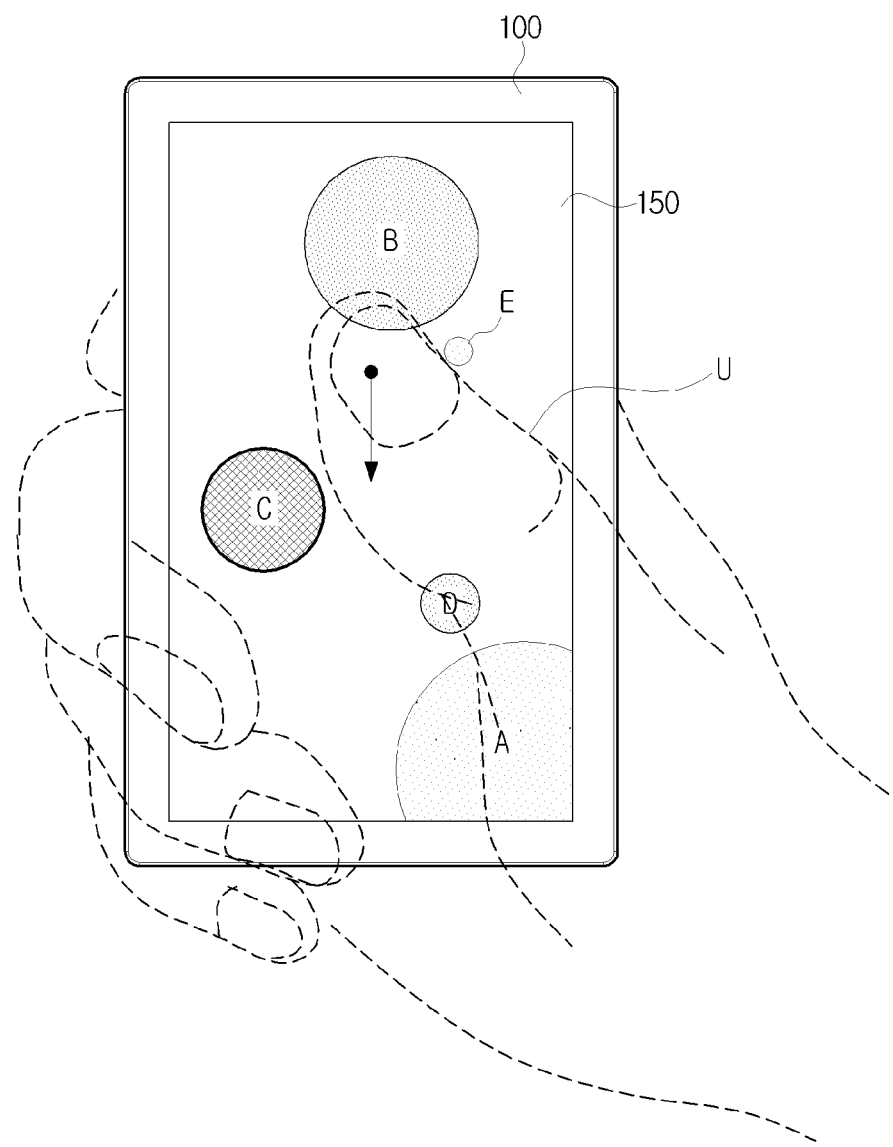

As shown in FIG. 3B, if the user U drags an area of the touch screen 150 other than the menus on the touch screen 150 downwards, the GUI changes as described below. The largest menu A is zoomed in, and moves outside the touch screen 150. During the movement, menu A decreases in clarity. Thus, menu A increases in size, becomes blurred, moves outside the touch screen 150, and disappears from the touch screen 150.

The second largest menu B is zoomed in, and moves towards the edge of the touch screen 150 so that part of menu B extends beyond the limits of the touch screen 150. During the movement, menu B decreases in clarity. Thus, menu B increases in size, becomes blurred, and moves towards the edge of the touch screen 150 so that part of menu B extends beyond the limits of the touch screen 150 and disappears.

The clearest menu C is zoomed in, and moves towards the edge of the touch screen 150 while remaining within the limits of the touch screen 150. During the aforementioned movement, menu C decreases in clarity. Thus, menu C increases in size, becomes blurred, and moves towards the edge of the touch screen 150 while remaining within the limits of the touch screen 150.

The second smallest menu D is zoomed in, and moves towards the edge of the touch screen 150 while remaining within the limits of the touch screen 150. During the aforementioned movement, menu D increases in clarity, so that menu D becomes the clearest of the menus displayed on the touch screen 150. Thus, menu D increases in size, is the clearest, and moves towards the edge of the touch screen 150 while remaining within the limits of the touch screen 150.

The smallest menu E is zoomed in, and moves towards the edge of the touch screen 150 while remaining within the limits of the touch screen 150. During the aforementioned movement, menu E increases in clarity. Thus, menu E increases in size, becomes clearer, and moves towards the edge of the touch screen 150 while remaining within the limits of the touch screen 150. In addition, menu F, which was not displayed on the touch screen 150, appears on the touch screen 150. Menu F follows menu E in order.

Figure 3C:
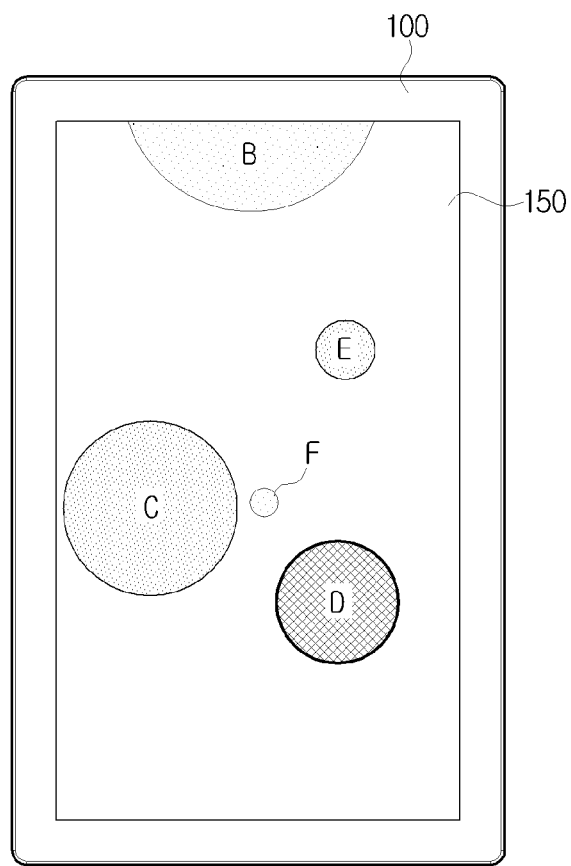

FIG. 3C shows a GUI where the change described above has been completed. As shown in FIG. 3C, in the GUI, menu A is removed and menu B is partly removed. Menu C increases in size, becomes blurred, and moves towards the edge of the touch screen 150 within the limits of the touch screen 150. Menu D increases in size, becomes the clearest, and moves towards the edge of the touch screen 150 while remaining within the limits of the touch screen 150. Menu E increases in size, becomes clearer, and moves towards the edge of the touch screen 150 while remaining within the limits of the touch screen 150; and menu F appears on the touch screen 150.

In the GUI of FIG. 3C, if the user U drags an area other than the menus on the touch screen 150 upwards, the GUI changes as shown in FIG. 3A. The process of changing the GUI can be inferred from FIGS. 2A and 2B and the detailed description thereof, so detailed description is omitted here.

Figure 4:
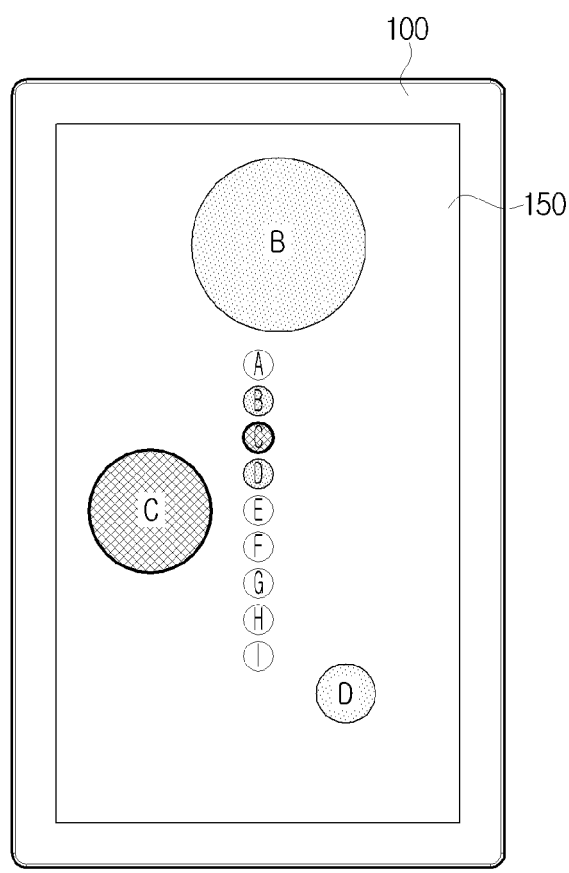
FIG. 4 illustrates a GUI according to still another embodiment of the present invention.

FIG. 4 illustrates a GUI according to still another embodiment of the present invention. The GUI of FIG. 4 is distinct from the GUI of FIG. 1A in that the GUI of FIG. 4 displays a position guide in the center, in addition to menus B, C, and D.

The position guide indicates the positions of menus displayed on the touch screen 150. As shown in FIG. 4, the position guide includes marks indicating all of the menus. Marks for menus that are currently displayed on the touch screen 150 are shown to be different from marks for menus that are not currently displayed on the touch screen 150.

In addition, marks for menus that are currently displayed on the touch screen 150 are also shown differently. A mark for a clearly displayed menu is also clear, and a mark for an unclearly displayed menu is also unclear. As shown in FIG. 4, a mark for clearly displayed menu C is clear, and marks for unclearly displayed menus B and D are unclear. The marks in the position guide include an indication (A, B, C, . . . , I) for corresponding menus, but may be implemented without the indications.

Figure 5A:
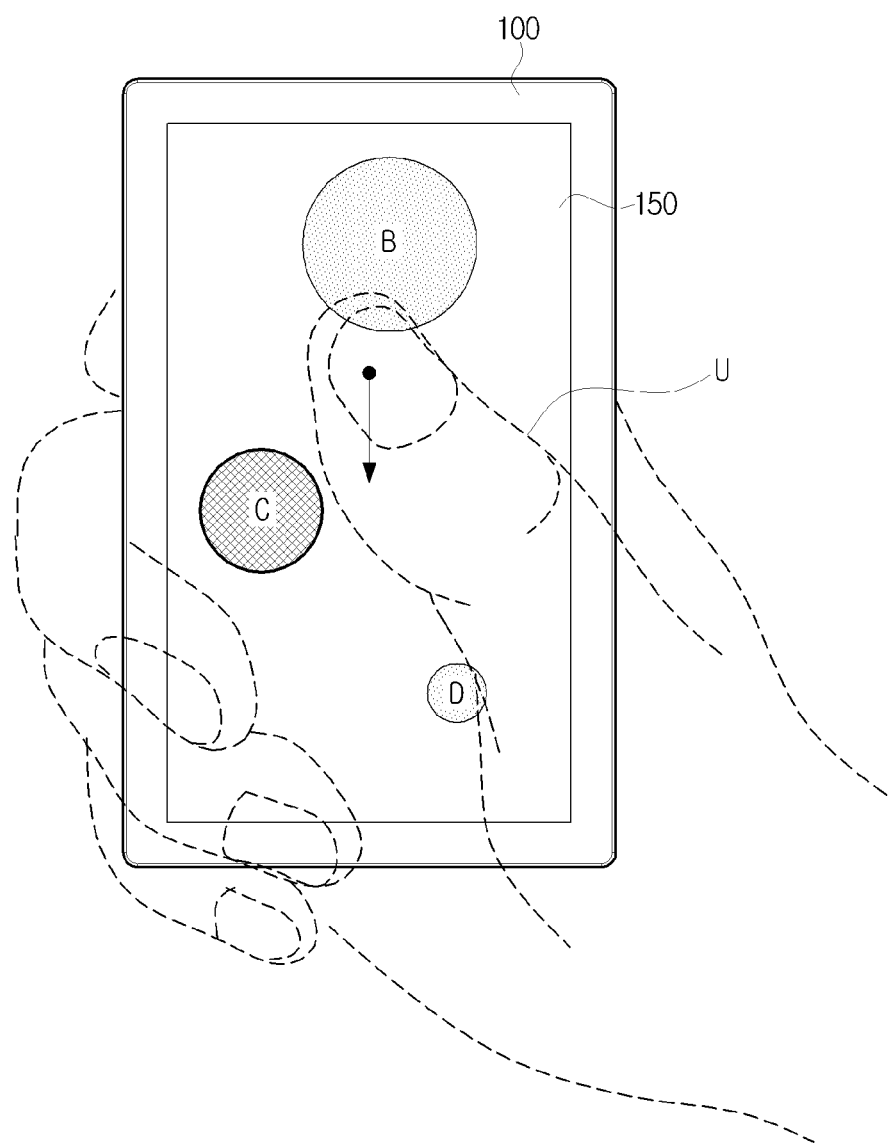
FIGS. 5A, 5B, 6A and 6B are drawings describing the process of changing the GUI according to the dragged distance.
Figure 5B:
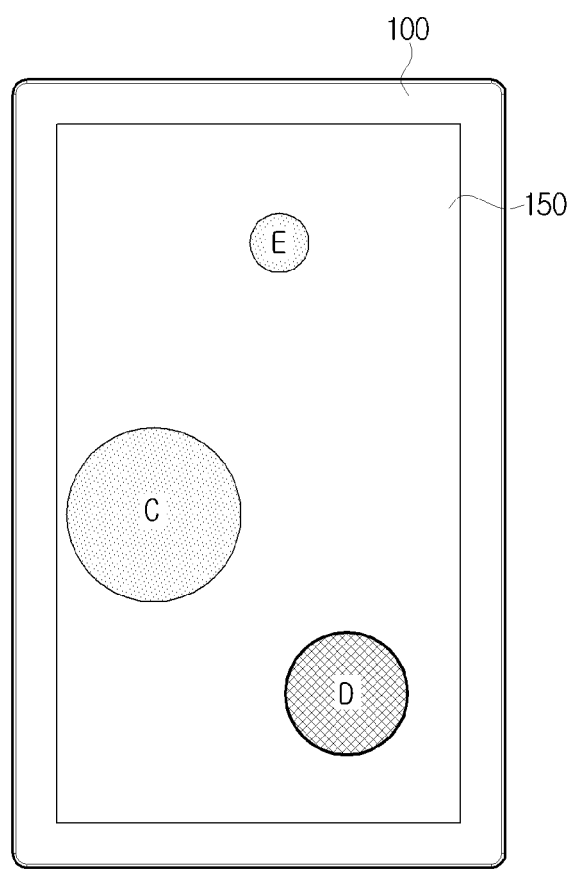

If the user U drags an area other than the menus on the touch screen 150 downwards as shown in FIG. 5A, the GUI changes. As shown in FIG. 5B, one menu (B) of displayed menus B, C, and D disappears, and one menu (E) appears.

Figure 6A:
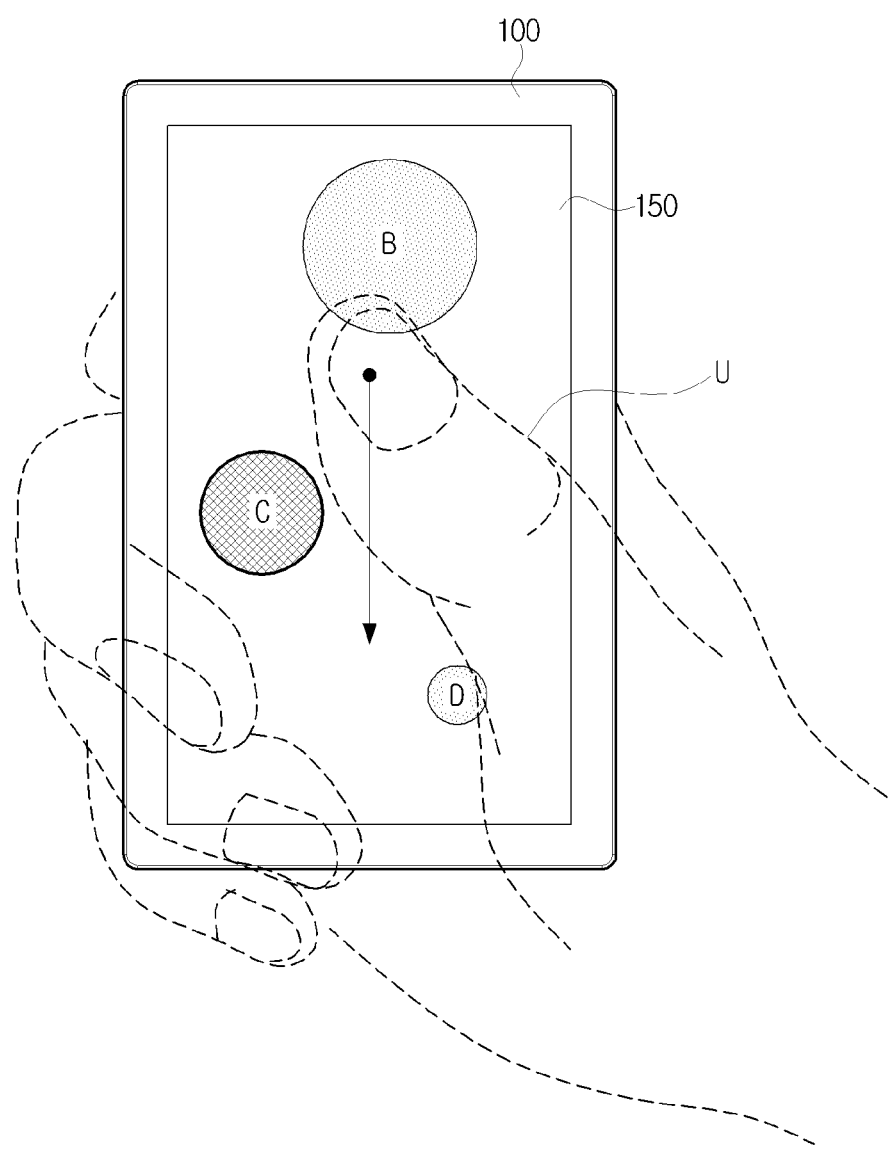
Figure 6B:
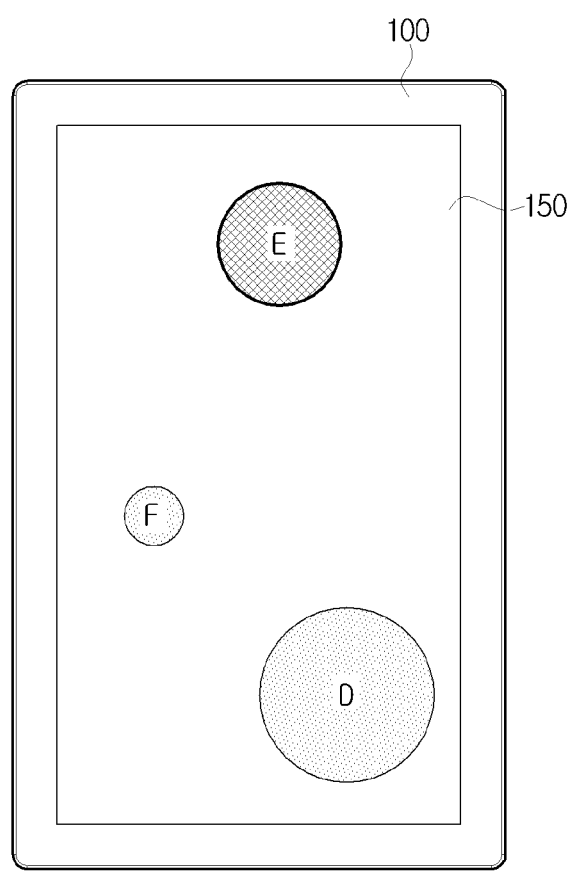

If the user U drags an area other than the menus on the touch screen 150 downwards at a longer distance as shown in FIG. 6A, two menus (B and C) from among displayed menus B, C, and D disappear, and two menus (E and F) newly appear. One menu (B) of the displayed menus B, C, and D disappears, and one menu (E) appears. Subsequently, one menu (C) of the displayed menus C, D, and E disappears, and one menu (F) appears. Consequently, the touch screen 150 displays menus D, E, and F as shown in FIG. 6B. Detailed description of the process of changing the GUI as shown from FIG. 5A to FIG. 5B or from FIG. 6A to FIG. 6B can be inferred from the detailed description of the process of changing the GUI as shown from FIG. 1B to FIG. 1C, and thus is omitted here.

In the embodiments described above with regard to FIGS. 5A, 5B, 6A, and 6B, the user U drags the touch screen 150 downwards; however, similar concepts may be applied even when the user U drags the touch screen 150 upwards.

Figure 7:
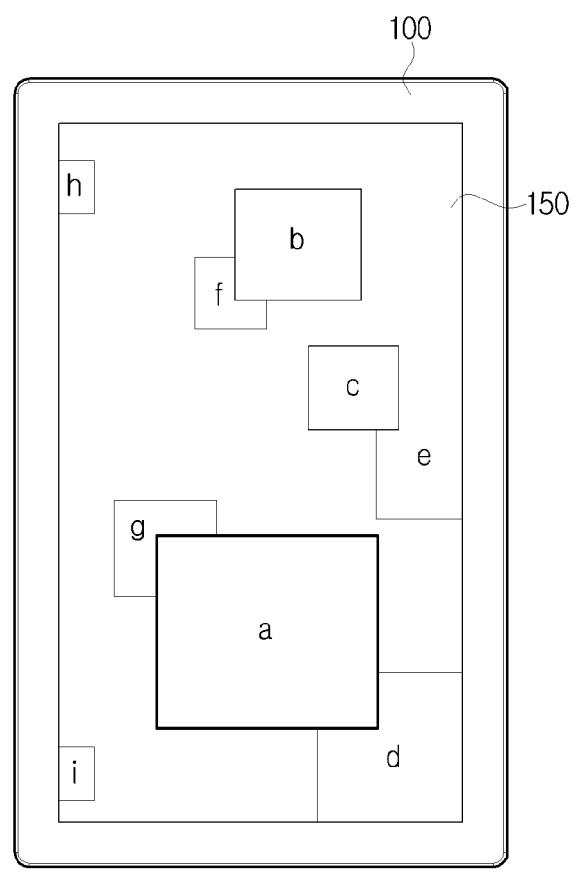
FIG. 7 illustrates a different type of GUI according to yet another embodiment of the present invention.

FIG. 7 shows a type of GUI which differs from that of FIG. 1A, according to still another embodiment of the present invention. Unlike the menus as shown in FIG. 1A, the images shown in FIG. 7 are rectangular. The number of images displayed in FIG. 7 is greater than the number of menus displayed in FIG. 1A. The depth level of the images displayed in FIG. 7 is also greater than the depth level (three) of the menus displayed in FIG. 1A.

Figure 8A:
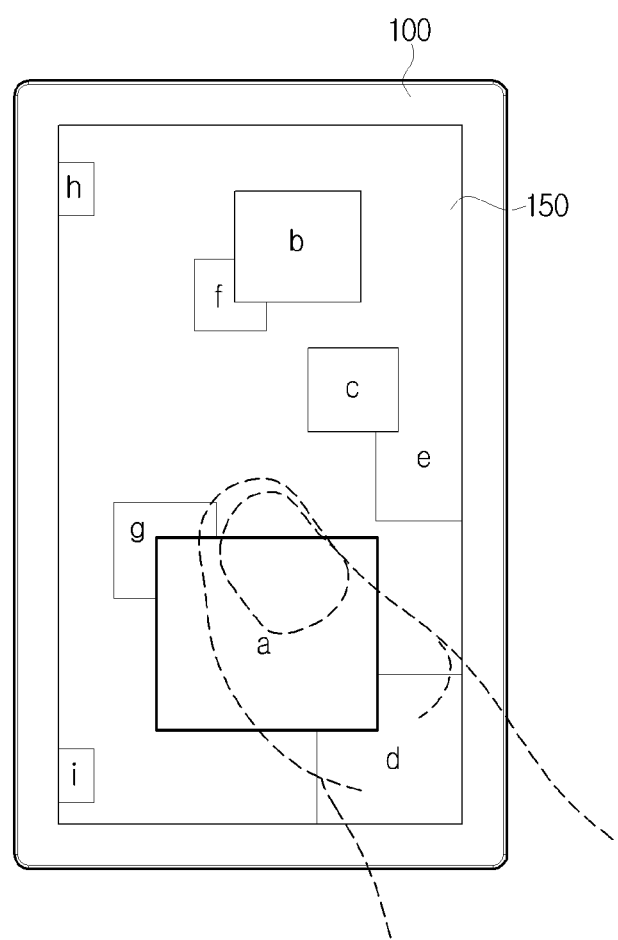
FIGS. 8A to 8D are drawings describing the process of changing the GUI of FIG. 7.
Figure 8B:
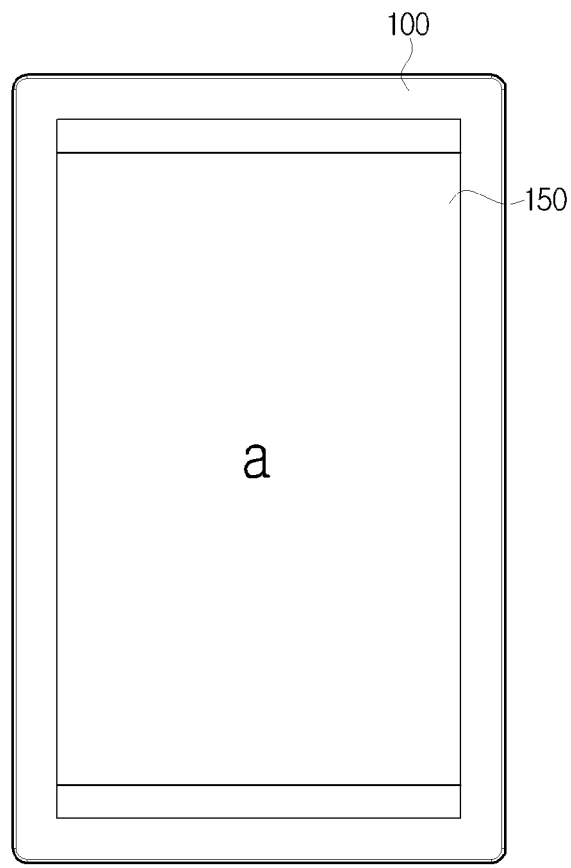
Figure 8C:
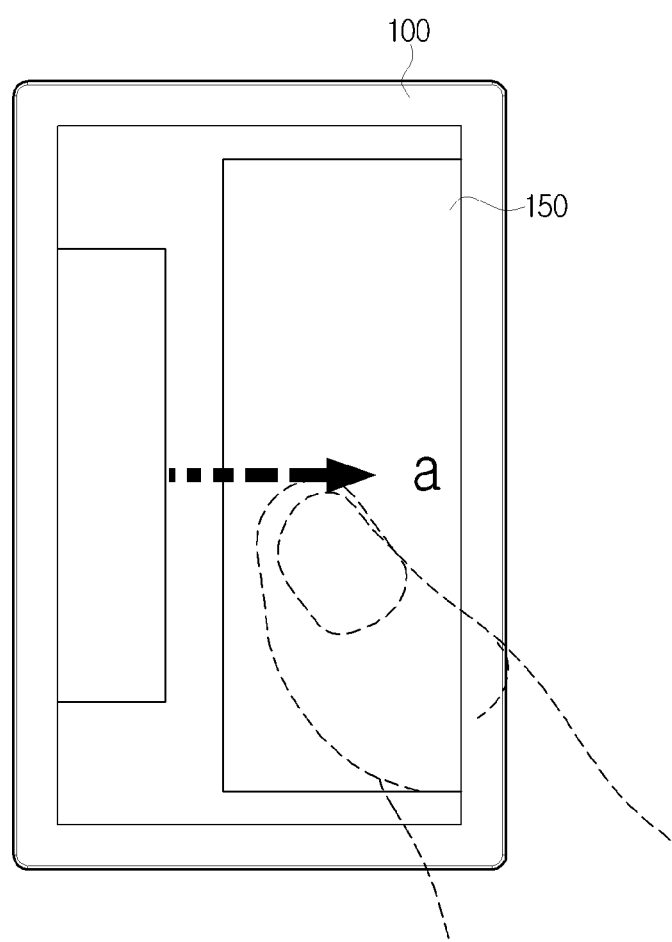
Figure 8D:
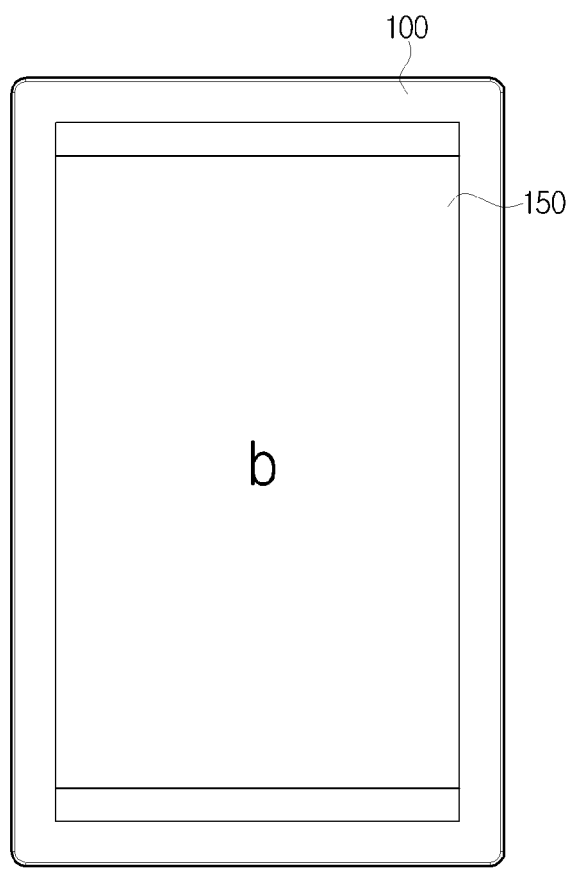

If the user touches a certain image, as shown in FIG. 8A, the touched image is enlarged and fully displayed on the touch screen 150, as shown in FIG. 8B. Subsequently, if the user U drags the touch screen 150 to the right, as shown in FIG. 8C, the enlarged image gradually moves to the right and disappears, and a subsequent image gradually moves from the left to the right, and is finally displayed on the touch screen 150 as shown in FIG. 8D. Furthermore, although not shown in the drawings, if the user U drags the touch screen 150 to the left, the enlarged image gradually moves to the left and disappears, a previous image gradually moves from the right to the left, and is finally displayed on the touch screen 150.

Figure 9:
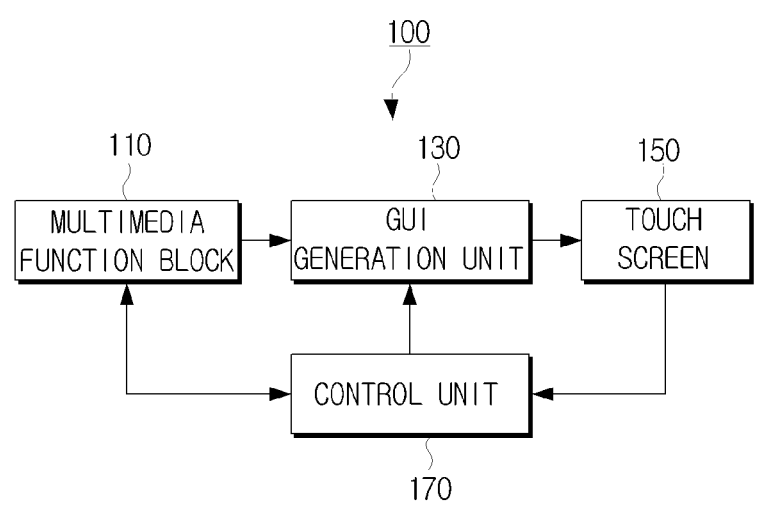
FIG. 9 is a block diagram of a multimedia device providing a GUI.

FIG. 9 shows a multimedia device 100 providing a GUI such as the GUIs described above. The multimedia device 100 includes a multimedia function block 110, a GUI generation unit 130, a touch screen 150, and a control unit 170. According to other aspects of the present invention, the multimedia device 100 may include additional and/or different units. Similarly, the functionality of two or more of the above units may be combined into a single component. The multimedia device 100 may be a mobile device, personal digital assistant (PDA), laptop computer, personal entertainment device, or other device.

The multimedia function block 110 performs native functions of the multimedia device 100, such as music playback, voice recording, movie playback, picture playback, file search, word processor, and game. The GUI generation unit 130 generates a GUI under the control of the control unit 170, and adds the generated GUI to an image output from the multimedia function block 110. The touch screen 150 displays the GUI-added image output from the GUI generation unit 130, and may receive input by being touched or dragged by the user.

The control unit 170 controls the operation of the multimedia function block 110 according to user commands input using the touch screen 150 or a manipulation unit (not shown), such as buttons, a keyboard, a mouse, a microphone, or other device to permit user input. The control unit 170 operates the GUI generation unit 130 to display a GUI on the touch screen 150 according to user commands. This process is described below in detail with reference to FIG. 10.

Figure 10:
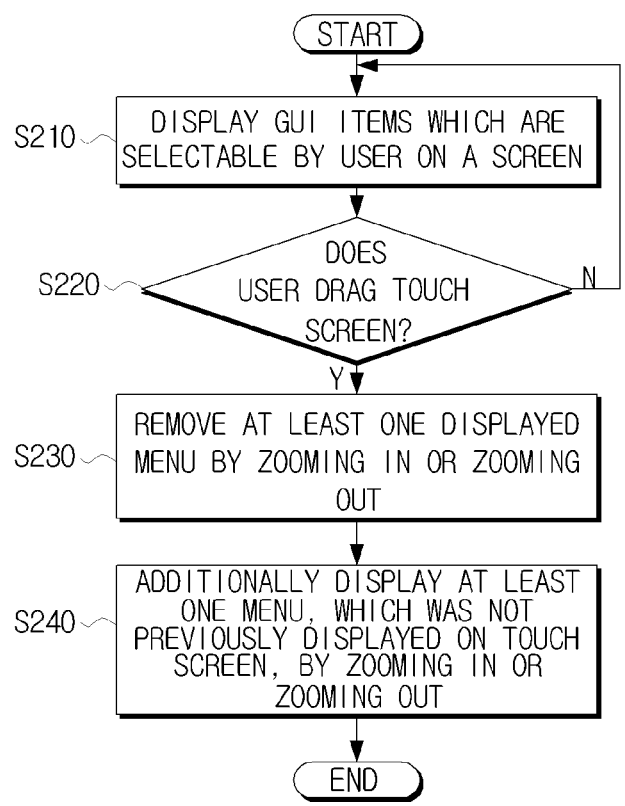
FIG. 10 is a flow chart illustrating a process by which the multimedia device of FIG. 9 provides a GUI.

As shown in FIG. 10, in operation S210, the control unit 170 operates the GUI generation unit 130 to display menus that can be selected by the user on the touch screen 150. The GUIs shown in FIGS. 1A, 3A, 4, and 7 can be displayed on the touch screen 150 as a result of operation S210. However, unlike the other GUIs, the GUI shown in FIG. 7 displays images, not menus.

If the user drags the touch screen 150 in operation S220-Y, the control unit 170 operates the GUI generation unit 130 to remove at least one of the menus displayed on the touch screen 150 by zooming-in or zooming-out in operation S230. In addition, the control unit 170 operates the GUI generation unit 130 to show at least one new menu, which was not previously displayed on the touch screen 150, by zoom-in or zoom-out in operation S240. Operation S240 may occur simultaneously with operation S230.

In operation S220, the user drags the touch screen 150 downwards (see FIG. 1B) or upwards (see FIG. 2A). If the user drags the touch screen 150 downwards in operation S220, the result of operations S230 and S240 is shown in FIG. 1C. However, if the user drags the touch screen 150 upwards in operation S220, the result of operations S230 and S240 is shown in FIG. 2B.

Moreover, in operation S220, the user may drag the touch screen 150 at a short distance (see FIG. 5A) or long distance (see FIG. 6A). If the user drags the touch screen 150 downwards at a short distance in operation S220, the result of operations S230 and S240 is shown in FIG. 5B. However, if the user drags the touch screen 150 upwards at a long distance in operation S220, the result of operations S230 and S240 is shown in FIG. 6B. According to other aspects of the invention, the process described with respect to FIG. 10 may be applied to any of the above-described GUIs.

A GUI that maintains a certain number of menus displayed on the touch screen 150 by zooming in or out menus through being dragged by the user, a method for providing the GUI, and a multimedia device using the same have been described in detail with reference to the exemplary embodiments. As described above, the number of menus which are displayed on the touch screen 150 remains at three, but this is merely an example for convenience of description. However, any number of menus may be displayed on the touch screen.

In addition, as shown in FIG. 5A, when the user drags the touch screen 150 downwards at a short distance, one of the displayed menus disappears and a new menu appears, and as shown in FIG. 6A, when the user drags the touch screen 150 downwards at a long distance, two of the displayed menus disappear and two new menus appear. However, these are merely examples for ease of description, and the number of menus that appear and disappear can vary. For example, as shown in FIG. 5A, when the user drags the touch screen 150 downwards at a short distance, two of the displayed menus disappear and two new menus appear, and as shown in FIG. 6A, when the user drags the touch screen 150 downwards at a long distance, three of the displayed menus disappear and three new menus appear.

As described above, menus and images are displayed on the GUI. According to other aspects of the invention, other items in addition to, or instead of, menus or images may be displayed on the GUI.

As described above, the menus move in three different directions (along three different axes) on the touch screen 150, but this is not intended as a limiting factor. According to other aspects of the invention, the number of axes may vary. Additionally, the number of menus disappearing from the touch screen 150 by being zoomed in or out may be the same as the number of menus newly appearing in the touch screen 150, or may be different.

As described above, if the user drags the touch screen 150 downwards, menus are zoomed in, and if the user drags the touch screen 150 upwards, menus are zoomed out, but this is not limiting. According to other aspects of the invention, the GUI may be implemented in the reverse fashion.

The manner by which the user may change menus is not limited to dragging. For example, if the user touches the touch screen 150 clockwise with a finger, menu change by zooming-in may be implemented to be continuously performed, and if the user touches the touch screen 150 counterclockwise with a finger, menu change by zooming-out is implemented to be continuously performed more than once. In addition, if the user drags the touch screen 150 to the left or to the right, menus constituting the GUI may change by moving to the left or right.

As described above, according to aspects of the present invention, menus in the GUI are made to appear or disappear by being zoomed in or out. Accordingly, a GUI to provide more convenient manipulation and better visual effects on a small screen can be provided.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of providing a graphical user interface (GUI), the method comprising:

displaying first GUI items of different sizes and different clarity selectable by a user on a screen; and removing from the screen at least one of the first GUI items displayed on the screen by touching the screen and dragging an area of the screen thereby generating a zooming in or a zooming out of the at least one of the first GUI items and displaying on the screen at least one second GUI item that was not previously displayed on the screen, wherein the removing of the at least one of the first GUI items and the additional displaying of the at least one second GUI item are performed simultaneously by dragging the area of the screen where the first GUI items are not displayed, wherein a number of the removed at least one of the first GUI items is the same as a number of the added at least one second GUI item, wherein sizes of the at least one of the first GUI items and the at least one second GUI item are changed by the zooming in or the zooming out of the at least one of the first GUI items when removing the at least one of the first GUI items and the additionally displaying of the at least one second GUI item, and wherein the different clarity of the displayed first GUI items based on the different sizes is indicated by a position guide simultaneously displayed on the screen.

2. The method of claim 1, wherein when the at least one of the first GUI items displayed on the screen is removed from the screen by zooming in, the additional displaying of the at least one second GUI item comprises displaying the at least one second GUI item by zooming in.

3. The method of claim 2, wherein:
the removing of the at least one of the first GUI items comprises moving the at least one of the first GUI items displayed on the screen outside of the screen by zooming in the at least one of the first GUI items and removing the at least one of the first GUI items from the screen; and
the additional displaying of the at least one second GUI item which is not previously displayed on the screen comprises moving the at least one second GUI item inside of the screen by zooming in the at least one of the first GUI items and displaying the at least one second GUI item on the screen.

4. The method of claim 2, wherein:
the removing of the at least one of the first GUI items comprises decreasing the clarity of the at least one of the first GUI items displayed on the screen by zooming in the at least one of the first GUI items and removing the at least one of the first GUI items from the screen; and
the additional displaying of the at least one second GUI item comprises increasing the clarity of the at least one second GUI item by zooming in the at least one second GUI item and displaying the at least one second GUI item on the screen.

5. The method of claim 1, wherein, when the at least one of the first GUI items displayed on the screen is removed from the screen by zooming out the at least one of the first GUI items, the at least one second GUI item which is not displayed on the screen is displayed by zooming out the at least one of the first GUI items.

6. The method of claim 5, wherein:
the removing of the at least one of the first GUI items displayed on the screen comprises moving the at least one of the first GUI items within the limits of the screen by zooming out the at least one of the first GUI items and removing the at least one of the first GUI items from the screen; and
the additional displaying of the at least one second GUI item which is not displayed on the screen comprises moving the at least one second GUI item from the outside of the screen to the inside of the screen by zooming out the at least one of the first GUI items and displaying the at least one second GUI item on the screen.

7. The method of claim 5, wherein:
the removing of the at least one of the first GUI items displayed on the screen comprises decreasing the clarity of the least one of the first GUI items by zooming out the at least one of the first GUI items and removing the at least one of the first GUI items from the screen; and
the additional displaying of the at least one second GUI item which is not displayed on the screen comprises increasing the clarity of the at least one second GUI item by zooming out the at least one of the first GUI items and displaying the at least one second GUI item on the screen.

8. The method of claim 1, wherein the clarity of a medium-sized GUI item from among the first GUI items displayed on the screen is greater than the clarity of the remaining GUI items displayed on the screen.

9. The method of claim 1, further comprising:
determining whether the user drags a portion of the screen;
wherein the removing and the additional displaying are performed if the user drags the portion of the screen.

10. The method of claim 9, wherein the number of removed GUI items and the number of additionally displayed second GUI items are determined according to the distance dragged by the user.

11. A multimedia device comprising:
a GUI generation unit to display first GUI items of different sizes and different clarity and selectable by a user on a screen; and
a control unit to operate the GUI generation unit so as to remove from the screen at least one of the first GUI items displayed on the screen by touching the screen and dragging an area of the screen thereby generating a zooming in or zooming out of the at least one of the first GUI items and displaying on the screen at least one second GUI item that was not previously displayed on the screen, wherein the at least one of the first GUI items removed from the screen and the at least one second GUI item additionally displayed on the screen are performed simultaneously by dragging the area of the screen where the at least one of the first GUI items are not displayed, wherein a number of the removed at least one of first GUI items is the same as a number of second GUI items, wherein sizes of the at least one of the first GUI items and the at least one second GUI item are changed by the zooming in or the zooming out of the at least one of the first GUI items when removing the at least one of the first GUI items and the additionally displaying of the at least one second GUI item, and wherein the different clarity of the displayed first GUI items based on the different sizes is indicated by a position guide simultaneously displayed on the screen.

12. The multimedia device of claim 11, further comprising:
a touch screen to display the first and second GUI items and to permit the user to manipulate the GUI items.

13. The multimedia device of claim 12, wherein the touch screen permits the user to manipulate the GUI items by dragging a finger across the touch screen.

14. The multimedia device of claim 11, further comprising:
a multimedia function block to perform at least one predetermined function of the multimedia device.

15. A multimedia device comprising:
a touch screen;

a GUI generation unit to display a plurality of first GUI items selectable by a user on the touch screen; and a control unit to control the GUI generation unit to display the plurality of first GUI items of different sizes and different clarity on the touch screen, to remove at least one of the plurality of first GUI items from the touch screen by zooming in or zooming out the at least one of the plurality of first GUI items and to display on the touch screen at least one second GUI item that was not previously displayed on the touch screen, wherein the at least one of the plurality of first GUI items removed from the touch screen and the at least one second GUI item additionally displayed on the touch screen are performed simultaneously by dragging an area of the touch screen where the at least one of the plurality of first GUI items are not displayed, wherein a number of removed first GUI items is the same as a number of added second GUI items, wherein sizes of the at least one of the plurality of first GUI items and the at least one second GUI item are changed by the zooming in or the zooming out of the at least one of the plurality of first GUI items when removing the at least one of the plurality of first GUI items and the additionally displaying of the at least one second GUI item, and wherein the different clarity of the displayed plurality of first GUI items based on the different sizes is indicated by the a position guide simultaneously displayed on the touch screen.

16. The multimedia device of claim 15, wherein, with respect to at least one third GUI item of the plurality of first GUI items, the GUI generation unit displays only a portion of the third GUI item.

17. The multimedia device of claim 15, wherein, when zooming in toward or zooming out from at least one of the plurality of first GUI items, the control unit controls the GUI generation unit to increase the clarity of some of the plurality of first GUI items and to decrease the clarity of others of the plurality of first GUI items.

18. The multimedia device of claim 15, wherein:

the control unit controls the GUI generation unit to zoom in when a user moves an input device in a first direction; and the control unit controls the GUI generation unit to zoom out when the user moves the input device in a second direction opposite to the first direction.

19. The multimedia device of claim 15, wherein:

the control unit controls the GUI generation unit to continuously zoom in the at least one of the plurality of first GUI items when a user moves an input device in a first direction; and the control unit controls the GUI generation unit to continuously zoom out the at least one of the plurality of first GUI items when the user moves the input device in a second direction opposite to the first direction.

20. The multimedia device of claim 15, wherein:

the control unit controls the GUI generation unit to move the plurality of first GUI items in a first direction when a user moves an input device in the first direction; and the control unit controls the GUI generation unit to move the plurality of first GUI items in a second direction when the user moves the input device in the second direction.

* * * * *